United States Patent [19]
Kojima

[11] Patent Number: 5,590,397
[45] Date of Patent: Dec. 31, 1996

[54] SELECTING AND PRIORITIZING RADIO TELEPHONE SYSTEMS AT RADIO TERMINAL

[75] Inventor: Susumu Kojima, Tokyo, Japan

[73] Assignee: NEC Corporation, Tokyo, Japan

[21] Appl. No.: 354,107

[22] Filed: Dec. 6, 1994

[30] Foreign Application Priority Data

Dec. 17, 1993 [JP] Japan ................... 5-317585

[51] Int. Cl.⁶ ........................... H04Q 7/00
[52] U.S. Cl. ............ 455/33.1; 455/54.2; 455/89; 455/186.1; 379/59
[58] Field of Search .................. 455/33.1, 33.4, 455/89, 185.1, 186.1, 186.2, 54.2, 33.2, 34.1, 54.1, 62; 379/59, 58

[56] References Cited

U.S. PATENT DOCUMENTS

| | | | |
|---|---|---|---|
| 4,916,728 | 4/1990 | Blair | 379/59 |
| 5,020,091 | 5/1991 | Krolopp et al. | 379/59 |
| 5,020,093 | 5/1991 | Pireh . | |
| 5,101,500 | 3/1992 | Marui | 455/32.1 |
| 5,159,625 | 10/1992 | Zicker | 379/59 |
| 5,261,117 | 11/1993 | Olson . | |
| 5,276,905 | 1/1994 | Hurst et al. | 455/33.1 |
| 5,437,053 | 7/1995 | Sawa et al. | 455/54.1 |
| 5,442,806 | 8/1995 | Barber et al. | 455/33.1 |
| 5,444,765 | 8/1995 | Marui et al. | 379/59 |
| 5,448,619 | 9/1995 | Evans et al. | 455/33.1 |

FOREIGN PATENT DOCUMENTS

| | | |
|---|---|---|
| 0563898 | 10/1993 | European Pat. Off. . |
| 2225512 | 5/1990 | United Kingdom . |
| 2271917 | 12/1992 | United Kingdom . |

OTHER PUBLICATIONS

GB Search Report; Feb. 17, 1995.
"Mobile Station—Land Station Compatibility Specification", by American National Standard, ANSI/EIA/TIA–553, 1989, 10 pages.

Primary Examiner—Reinhard J. Eisenzopf
Assistant Examiner—Doris To
Attorney, Agent, or Firm—Sughrue, Mion, Zinn, Macpeak & Seas

[57] ABSTRACT

In a radio telephone scheme in which each of radio systems transmits a system identification code, and each radio system offers a service for a radio terminal, system identification codes of a plurality of radio systems, from which a user gets the service, and selection priorities corresponding to the system identification codes are stored. When a plurality of stored identification codes are received, a radio system having a system identification code, of the stored system identification codes, which corresponds to a highest selection priority is selected.

3 Claims, 11 Drawing Sheets

| SYSTEM NUMBER | SYSTEM IDENTIFICATION CODE | SELECTION INFORMATION | PRIORITY | SYSTEM NAME |
|---|---|---|---|---|
| 1 | 102345 | 1 | 1 | HOME |
| 2 | 106789 | 1 | 2 | HEAD OFFICE |
| 3 | 106790 | 0 | 4 | BRANCH OFFICE |
| 4 | 500010 | 1 | 3 | TOKYO |
| 5 | 500020 | 0 | 5 | OSAKA |

| SYSTEM NUMBER | SYSTEM IDENTIFICATION CODE | PRIORITY | SYSTEM NAME |
|---|---|---|---|
| 1 | 102345 | 1 | HOME |
| 2 | 106789 | 2 | HEAD OFFICE |
| 3 | 106790 | 4 | BRANCH OFFICE |
| 4 | 500010 | 3 | TOKYO |
| 5 | 500020 | 5 | OSAKA |

| SND | END | PWR |
|---|---|---|
| CLR | MEM | FCN |
| 1<br>Q Z | 2<br>ABC | 3<br>DEF |
| 4<br>GHI | 5<br>JKL | 6<br>MNO |
| 7<br>PRS | 8<br>TUV | 9<br>WXY |
| ✻ ▷ | 0 | # ◁ |

FIG. 5A

| SYSTEM NUMBER | SYSTEM IDENTIFICATION CODE | SELECTION INFORMATION | SYSTEM NAME |
|---|---|---|---|
| 1 | 102345 | 1 | HOME |
| 2 | 106789 | 1 | HEAD OFFICE |
| 3 | 106790 | 0 | BRANCH OFFICE |
| 4 | 500010 | 0 | TOKYO |
| 5 | 500020 | 0 | OSAKA |

FIG. 5B

| SYSTEM NUMBER | SYSTEM IDENTIFICATION CODE | SELECTION INFORMATION | PRIORITY | SYSTEM NAME |
|---|---|---|---|---|
| 1 | 102345 | 1 | 1 | HOME |
| 2 | 106789 | 1 | 2 | HEAD OFFICE |
| 3 | 106790 | 0 | 4 | BRANCH OFFICE |
| 4 | 500010 | 1 | 3 | TOKYO |
| 5 | 500020 | 0 | 5 | OSAKA |

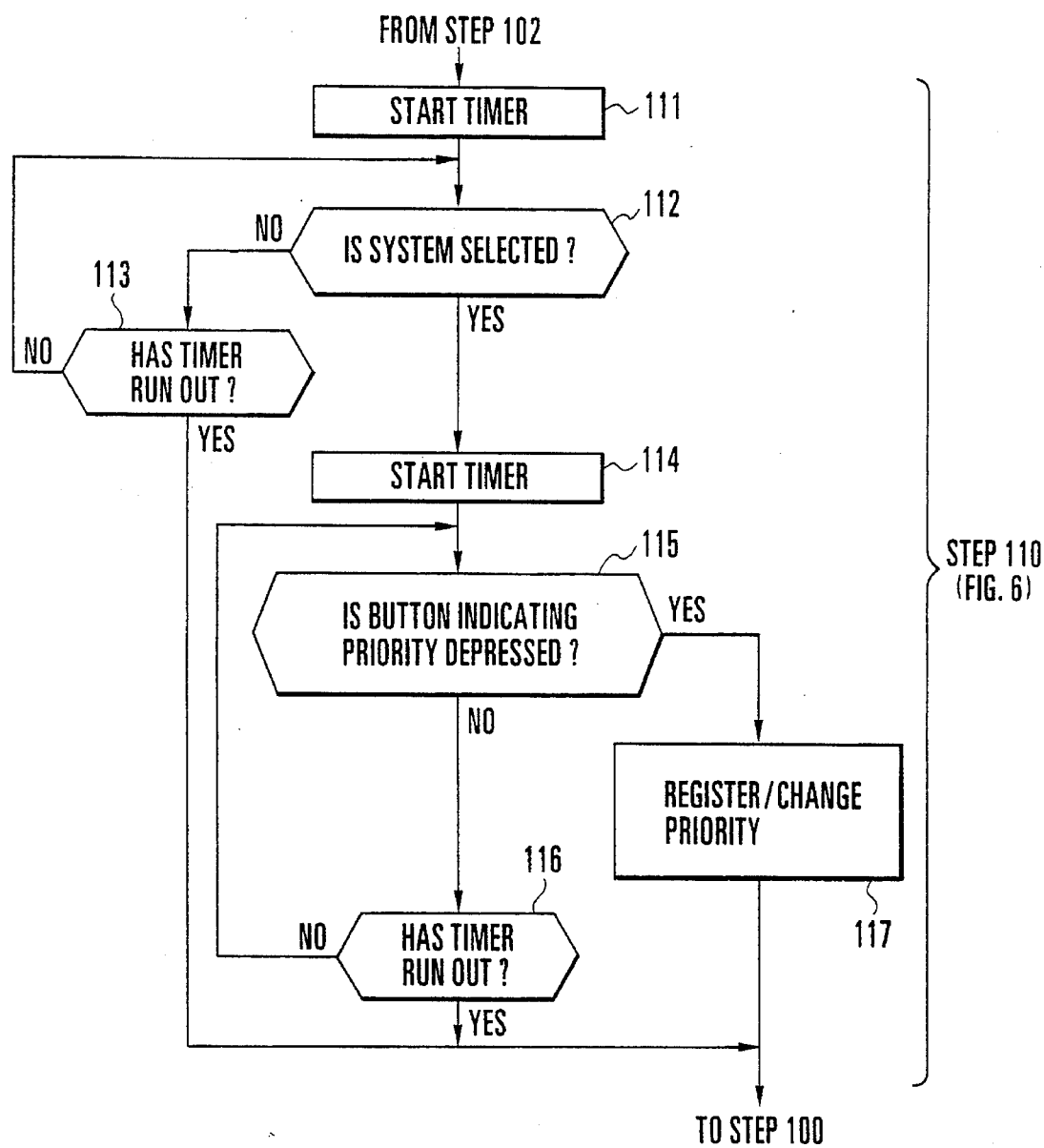
F I G.7

5,590,397

SELECTING AND PRIORITIZING RADIO TELEPHONE SYSTEMS AT RADIO TERMINAL

BACKGROUND OF THE INVENTION

The present invention relates to a radio telephone system and a terminal therefor.

A mobile telephone system is an example of a radio telephone system which is currently available. In this telephone system, a plurality of telephone service companies offer services within a single area. A radio terminal, i.e., a mobile station, is registered in one of the companies, and the subscriber can get services only within the telephone network or system of this company. Therefore, the subscriber cannot arbitrarily select a telephone service company or a telephone system.

In a mobile telephone system, radio frequencies are assigned fixedly to respective radio base stations. For this reason, when a plurality of systems are to be installed in a single area, different frequencies are assigned to the respective systems, even if they operate according to the same control scheme. The systems can be classified as "public" or "private" radio telephone systems. Public systems are characterized by widespread availability throughout a geographic area, but private systems are generally available only within limited areas, such as a compound, office complex, factory, home, or the like.

On the other hand, demands have arisen for service diversification which allows each subscriber to arbitrarily select a system depending on differences in services and charges between wireless communication networks. That is, a common air interface needs to be used. The above-described systems, however, are not designed to use a common air interface.

In the second-generation cordless telephone plan, which has recently been proposed in Japan, the use of a common air interface has been considered. In this plan, one radio terminal can be used in the home and office, and outdoors. As disclosed in Japanese Patent Application No. 5-155518, in such a system, it is important that the radio connection can be made through the common radio terminal of a user even if the home and office are located in the service area of a radio connection unit installed by a different telephone service company.

SUMMARY OF THE INVENTION

The present invention has been made in consideration of the above situation, and has as its object to allow a user to efficiently perform system selection in accordance with a user's request.

In order to achieve the above object, according to the present invention, there is provided a radio system used for a radio telephone scheme in which each radio system uses a unique system identification code, and each radio system offers a service for a radio terminal, wherein system identification codes of a plurality of radio systems, from which a user gets the services, and selection priorities corresponding to the system identification codes, are stored, and when a plurality of system identification codes are received which match codes stored in the terminal, the radio system having the a system identification code which corresponds to a highest selection priority is selected.

BRIEF DESCRIPTION OF THE DRAWINGS

FIG. 3 is a view showing an example of the information configuration of a system information memory incorporated in a radio terminal;

FIG. 4 is a view showing an operation button unit;

FIGS. 5A and 5B are views showing the contents of systems selected/designated by a user;

FIG. 7 is a flow chart showing a priority setting operation in FIG. 6;

DESCRIPTION OF THE PREFERRED EMBODIMENT

Figure 1:
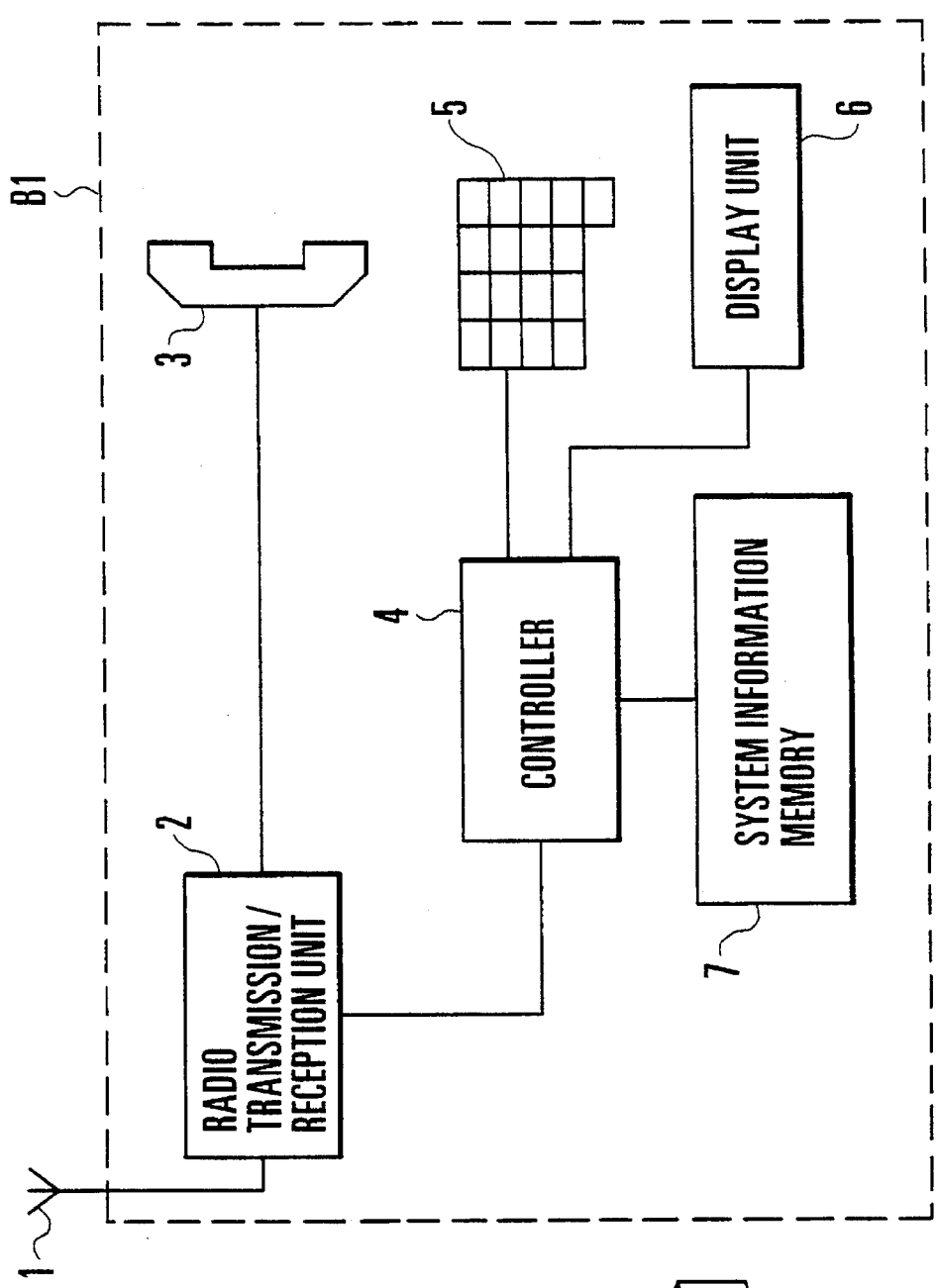
FIG. 1 is a block diagram showing the arrangement of an embodiment of the present invention.
Figure 1:
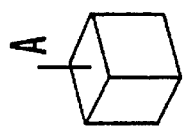
Figure 1:
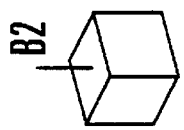
Figure 1:
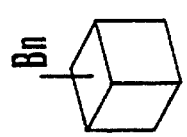

FIG. 1 shows a radio telephone system according to an embodiment of the present invention. Referring to FIG. 1, reference symbol A denotes a radio base station; and B1 to Bn, radio terminals. Since the respective radio terminals have the same arrangement, the radio terminal B1 will be described as a representative. A signal from the radio base station A is sent to a radio transmission/reception unit 2 via an antenna 1. The signal from the radio base station A is separated into a speech signal and a control signal by the radio transmission/reception unit 2. The speech signal is sent to a handset 3. The control signal is sent to a controller 4.

The speech signal from the handset 3 and the control signal from the controller 4 are sent from the radio transmission/reception unit 2 to the radio base station A via the antenna 1.

The controller 4 monitors the state of an operation button unit 5 operated by a user and controls the display of a display unit 6. The controller 4 can write/read data in/from a system information memory 7 constituted by a nonvolatile storage element.

Figure 2:
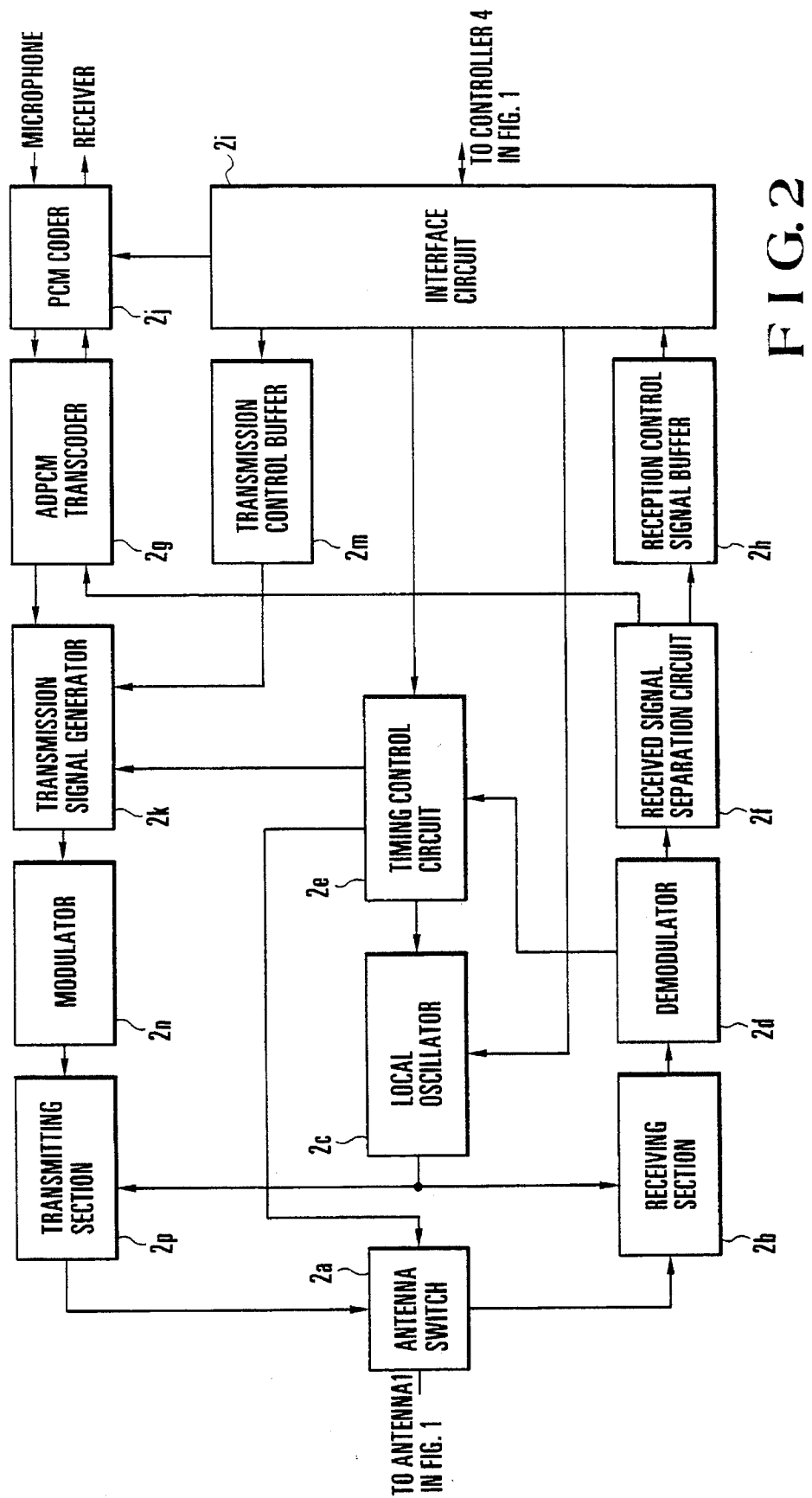
FIG. 2 is a block diagram showing the internal arrangement of a radio transmission/reception unit.

FIG. 2 shows the internal arrangement of the radio transmission/reception unit 2 incorporated in the radio terminal B1. A signal input through the antenna 1 is supplied to a receiving section 2b via an antenna switch 2a. The receiving section 2b performs frequency conversion of the input signal by using a signal supplied from a local oscillator 2c, and supplies the frequency-converted signal to a demodulator 2d. The demodulator 2d separates a timing signal from the supplied signal and supplies the timing signal to a timing control circuit 2e. In addition, the demodulator 2d supplies a signal other than the timing signal to a received signal separation circuit 2f. The received signal separation circuit 2f separates a PCM speech signal and a data signal from the supplied signal. The received signal separation circuit 2f supplies the speech signal to an ADPCM transcoder 2g, and the data signal to the controller 4 via a reception control signal buffer 2h and an interface circuit 2i. The PCM speech signal supplied to the ADPCM transcoder 2g is converted into a speech signal by a PCM codec 2j and supplied to the handset 3.

A speech signal from the handset 3 is converted into a PCM signal by the PCM codec 2j and the ADPCM transcoder 2g and supplied to a transmission signal generator 2k. The transmission signal generator 2k receives a data signal from the controller 4 via the interface circuit 2i and a transmission control buffer 2m, and also receives a timing signal from the timing control circuit 2e. These signals are converted into signals suitable for transmission and modulated by a modulator 2n. The modulated signals are then supplied to the antenna 1 via a transmitting section 2p and the antenna switch 2a to be transmitted.

A control signal is controlled such that a predetermined timing relationship is established between a download control signal, periodically burst-transmitted from the radio base station A, and an upload control signal. This timing control is performed by the timing control circuit 2e. More specifically, the timing control circuit 2e holds a transmission/reception timing on the basis of a bit synchronization clock reproduced by the demodulator 2d and a frame synchronization clock detected by the received signal separation circuit 2f, and supplies necessary timing information to each section.

FIG. 3 shows an example of the information configuration of the system information memory 7 incorporated in the radio terminal B1 shown in FIG. 1. "System number" indicates the reference number of the information of a radio system in which the radio terminal is registered. A system number is used to store necessary information in the system information memory 7 or update/erase information. When no system name is used, a system number is used to display a system selected by the radio terminal with a number. "System identification code" indicates the identification code of a radio system in which the radio terminal is registered. "Priority" indicates the priories of radio systems to be selected by the radio terminal.

Note that a system identification code is registered (i.e., stored in non-volatile memory) in a radio terminal by a distributor or an outdoor public service company to prevent a connection error and the like. More specifically, only a distributor or a service company are informed of a method for registering a system identification code in a radio terminal. Therefore, the system identification code of a home or office radio system is registered by a service company, or distributor entrusted by the company. In this case, the user is notified as to the registered system identification code itself.

In displaying a selected radio system on the display unit of the radio terminal, "system name" indicates display contents for easy understanding, instead of a number, for the convenience of the user. In this case, "home" indicates a radio system installed in the home; "head office", a radio system installed in the head office of the company in which the user works; "branch office", a radio system installed in a branch office; and "Tokyo" and "Osaka", outdoor public radio systems in Tokyo and Osaka. Note that systems other than the public radio systems are private radio systems.

The user inputs a priority and a system name by operating the operation button unit 5. As shown in FIG. 4, the operation button unit 5 is constituted by a plurality of buttons. Reference symbol SND denotes a sending/receiving button for performing an outgoing call generating operation and an incoming call response operation; END, an on-hook button used at the end of speech communication; PWR, a power button used for power-on and power-off operations; CLR, a clear button used to erase or correct an input error; MEM, a memory button used to set a memory dial; and FCN, a function button used to perform function menu selection. The buttons indicated by marks "Δ" and "∇" are scroll buttons.

Menu selection is performed by depressing a numeral button of one digit after depressing the function button FCN. In this case, if the numeral button "1" is depressed after the function button FCN is depressed, priority input processing is designated. Similarly, the numeral button "2" designates selection information input processing; and the numeral button "3", system name input processing.

FIG. 5A shows an example of the information configuration of the system information memory 7 without priority information in a case wherein the user selects/designates a specific radio system set in a standby state. FIG. 5B shows an example of the information configuration of the system information memory 7 with priority information. Selection information is input by the user. Selection information "1" indicates that the corresponding system is selected.

Figure 6:
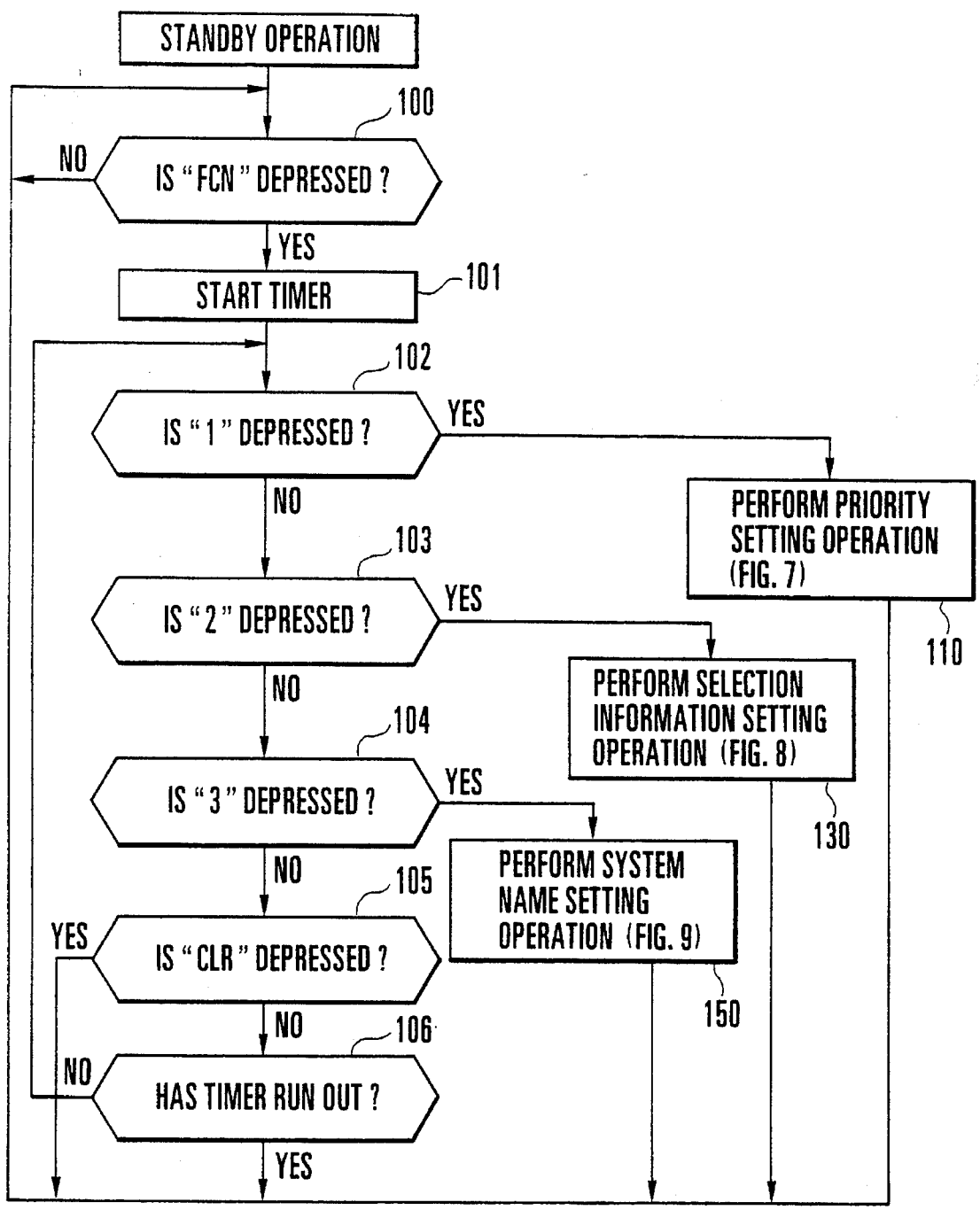
FIG. 6 is a flow chart showing a standby operation.

When a power-on operation is performed, the radio terminal B1 starts to operate. As a result, the standby processing shown in FIG. 6 is started. In this processing, if it is determined in step 100 that the function button FCN is depressed, the flow advances to step 101 to start a timer. If it is determined in step 102 that the numeral button "1" is depressed before timer runout, the priority setting processing in step 110 is performed. Similarly, if it is determined in step 103 that the numeral button "2" is depressed, the selection information setting processing in step 130 is performed. If it is determined in step 104 that the numeral button "3" is depressed, the system name setting processing in step 150 is performed.

If none of these numeral keys are depressed and it is determined in step 105 that the clear button CLR is depressed, or if it is determined in step 106 that the timer set in step 101 has run out, the flow returns to step 100 to wait for depression of the function button FCN.

As shown in FIG. 7, in the priority setting processing in step 110, the first timer is started in step 111, and system selection is performed in step 112 to select a specific system for which a priority is to be set. In this system selection, either a system number or a system identification code is determined in advance to be input. When system selection is completed, the second timer for a priority setting operation is started in step 114. If it is determined in step 115 that a numeral button indicating the priority of the selected system is depressed, the priority is registered in step 117. If a priority has already been registered, the priority is updated. If a button indicating priority is not depressed within a predetermined period of time in step 115, it is determined in step 116 that the second timer started in step 114 has run out. The flow then returns to step 100 to check whether the function button FCN is depressed.

If system selection is not performed within a predetermined period of time in step 112, it is determined in step 113 that the first timer started in step 111 has run out. The flow then returns to step 100.

Figure 8:
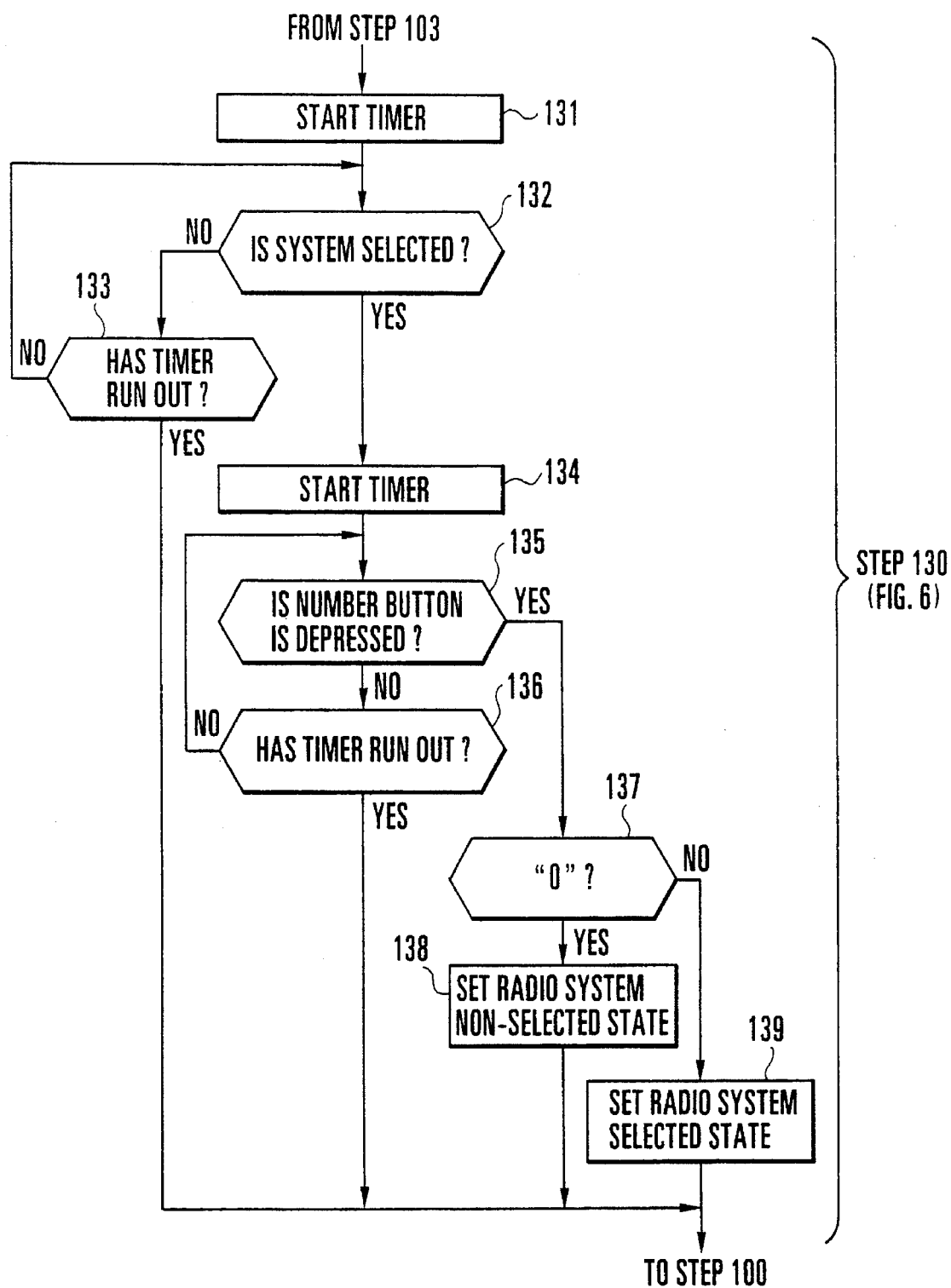
FIG. 8 is a flow chart showing a selection information setting operation in FIG. 6.

As shown in FIG. 8, in the selection information setting processing in step 130, the first timer is started in step 131, and system selection is performed in step 132 to select a specific system for which a priority is to be set. In this system selection, either a system number or a system identification code, which is determined in advance, is input.

When system selection is performed, the second timer for a selection information setting operation is started in step 134. If it is determined in step 135 that a numeral button indicating the priority of the selected system is depressed, it is checked in step 137 whether the depressed button is the numeral button "0". If YES in step 137, the system is set in a non-selected state in step 138. If a numeral button other than the numeral button "0" is depressed, the system is set in a selected state in step 139.

As shown in FIG. 5A or 5B, "1" is set for the selected system, and "0" for the non-selected system.

Figure 9:
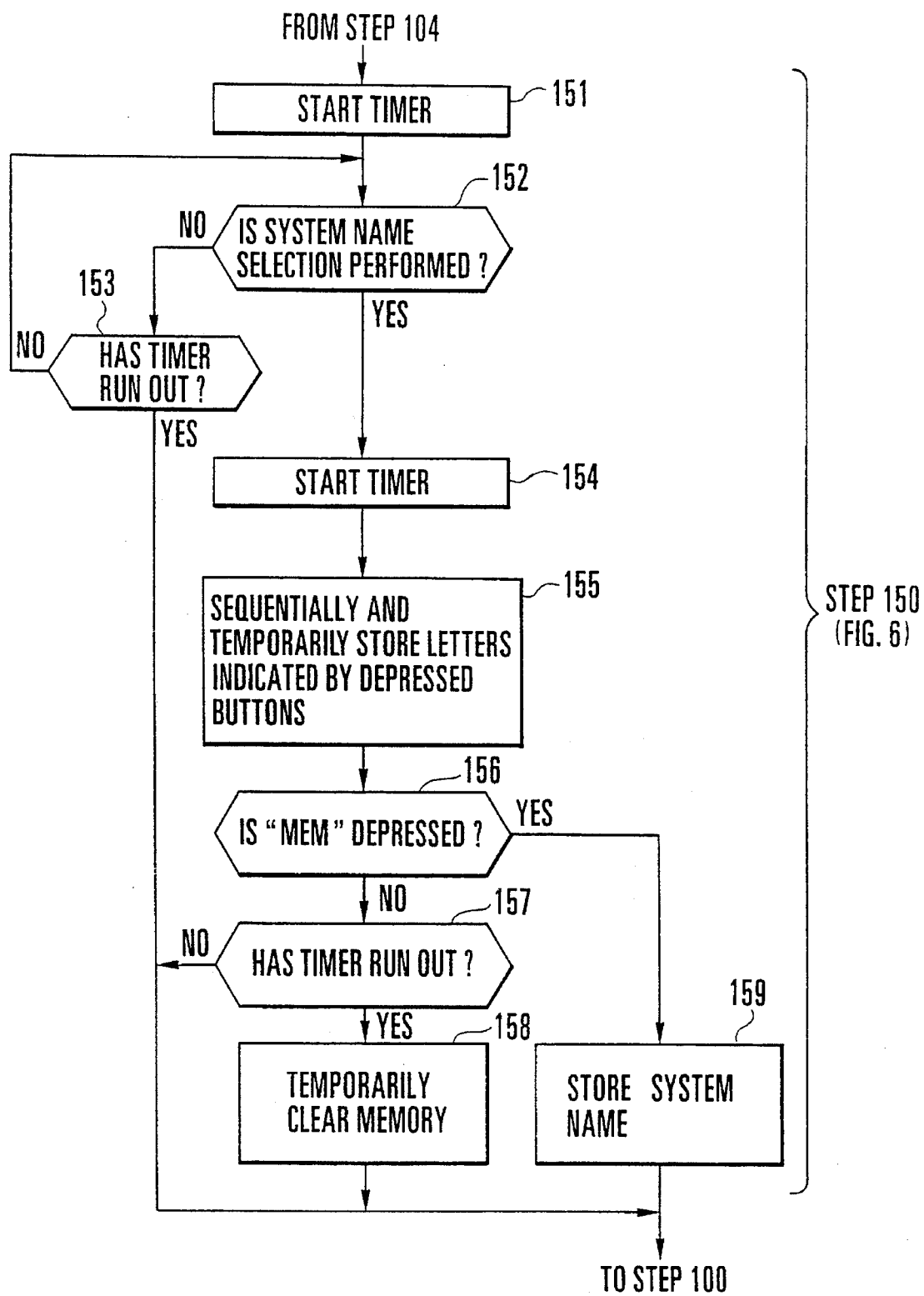
FIG. 9 is a flow chart showing a system name setting operation in FIG. 6.

As shown in FIG. 9, in the system name setting processing in step 150, the first timer is started in step 151, and system selection is performed in step 152 to select a specific system for which a system name is set. In this system selection, either a system number or a system identification code, which is determined in advance, is input. When system selection is completed, the second timer for a system name setting operation is started in step 154, and letters indicating the selected system are sequentially and temporarily stored in step 155.

In this case, a plurality of letters are assigned to each button. When a given button is depressed once, the letter written on the left end portion of the button is input. When the button is depressed twice within a predetermined period of time, the letter written on the right side of the above letter is input. When the same button is depressed again within a predetermined period of time after the second depression, the letter on the right side of the above letter is input.

If a required number of letters are input and it is determined in step 156 that the memory button MEM is depressed, a system name is registered (i.e., stored in non-volatile memory) in step 159, and the flow returns to step 100 to check whether the function button FCN is depressed. If the memory button MEM is not depressed within predetermined period of time, it is determined in step 156 that the second timer started in step 154 has run out, and the data temporarily stored in step 155 is cleared. The flow then returns to step 100 to check whether the function button FCN is depressed. If system name selection is not performed within a predetermined period of time, it is determined in step 153 that the first timer started in step 151 has run out, and the flow returns to step 100.

Figure 10:
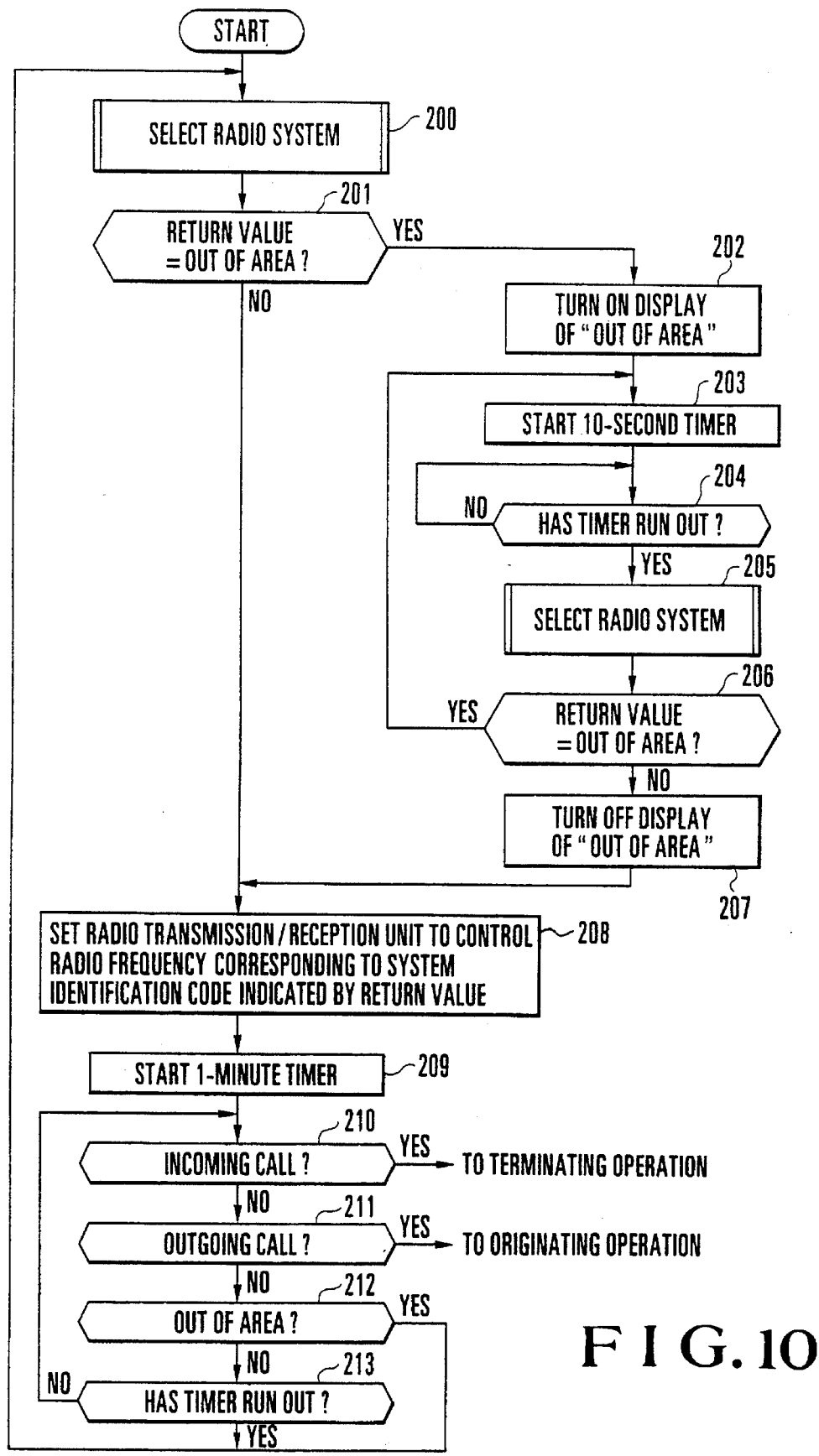
FIG. 10 is a flow chart showing the operation of a controller in FIG. 4.

After the processing shown in FIG. 6 is completed (if required), or after a power-on operation (if the processing in FIG. 6 is not required), the processing shown in FIG. 10 is performed to check whether the radio terminal B1 is located outside a service area. If it is determined that the radio terminal is not located outside the service area, radio frequency setting processing is performed. An operation associated with the information configuration shown in FIG. 5B will be described below as an example.

Figure 11:
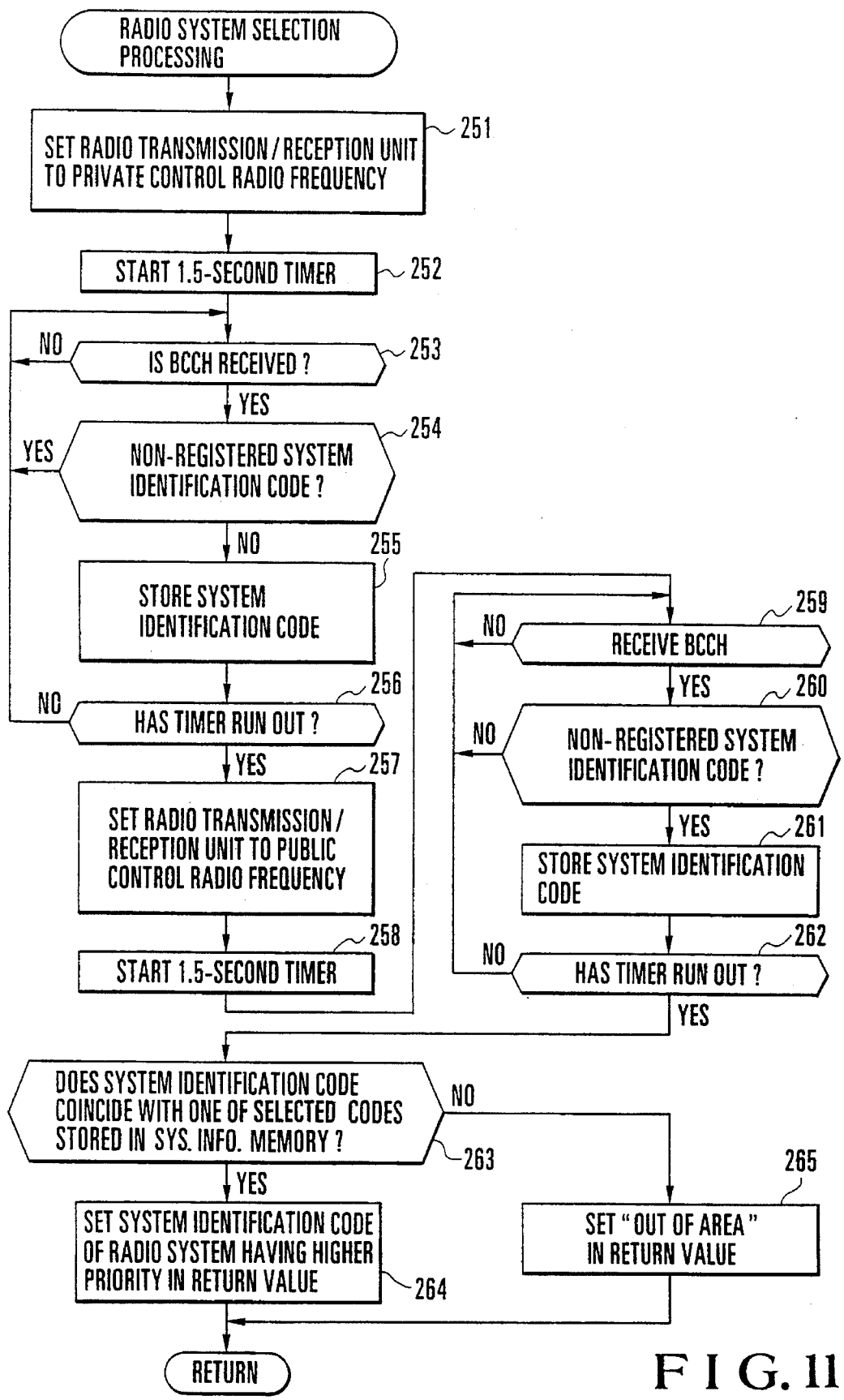
FIG. 11 is a flow chart showing radio system selection processing in FIG. 10.

In step 200, radio system selection processing is performed. As shown in FIG. 11, in this processing, when selection information is set, for example, in the manner shown in FIG. 5B, a radio system having the highest priority is selected from the three radio systems "home", "head office", and "Tokyo", each capable of receiving a selection signal, for which selection information "1" is set.

Referring to FIG. 11, in step 251, the radio transmission/reception unit 2 is set to a private control radio frequency. In step 252, a 1.5-second timer is started. A private control radio frequency corresponds to "home", "head office", and "branch office" in the case shown in FIG. 3, and an outdoor public radio frequency corresponds to "Tokyo" and "Osaka". If it is determined in this state that a notification signal BCCH contained in the radio frequency is detected, it is checked in step 254 whether the signal is a non-registered system identification code. If it is determined in step 253 that any notification signal cannot be received, the flow waits until a notification signal is received. If it is determined in step 254 that the signal is a non-registered system identification code, the flow returns to step 253 to wait until a system identification code other than a non-registered system identification code is received.

If it is determined in step 254 that the system identification code is not a non-registered system identification code, the code is stored in step 255. In step 256, it is checked whether the 1.5-second timer started in step 252 has run out. If it is determined that the 15-second timer has run out, the radio transmission/reception unit 2 is set to an outdoor public control radio frequency in step 257. In step 258, the 1.5-second timer is started. In steps 259 to 262, if a registered system identification code is received, the code is stored, similar to the processing in steps 253 to 256.

In step 263, it is checked whether the stored system identification code coincides with one of the registered system identification codes (in the system information memory 7) having selection information "1". That is, it is checked whether the received system identification code coincides with one of the selected, registered system identification codes (e.g., those indicated by selection information "1" in FIG. 5B). If YES in step 263, the system identification code of the radio system having the highest priority is set in a return value. If NO in step 263, "out of area" is set in the return value in step 265.

When radio system selection is completed in this manner, it is checked in step 201 in FIG. 10 whether the return value is "out of area". If NO in step 201, the radio transmission/reception unit 2 is set to a control radio frequency for a radio system having a system identification code indicated by the return value in step 208. In step 209, a 1-minute timer is started.

If an incoming call is determined in step 210 before it is detected in step 213 that the 1-minute timer has run out, a terminating operation is performed. If an outgoing call is detected in step 211, an originating operation is performed. Since terminating and originating operations are known and are not directly associated with the present invention, an illustration of the operations is omitted.

If neither an incoming call nor an outgoing call are detected, it is checked in step 212 whether the radio terminal B1 is located outside the area. If YES in step 212, the flow returns to step 200 to perform radio system selection. If NO in step 212, it is checked in step 213 whether the 1-minute timer started in step 209 has run out, and the flow returns to step 200.

If YES in step 201, the display of "out of area" is turned on in step 202, and a 10-second timer is started in step 203. Even if it is determined at the timing of step 201 that the radio terminal B1 is located outside the area, the terminal may return to the area during the operation of the 10-second timer. For this reason, in step 204, the flow waits until the 10-second timer runs out. In step 205, radio system selection is performed. This result is determined in step 206. If it is determined that the radio terminal B1 has returned to the area, the display of "out of area" is turned off in step 207, and processing in step 208 and the subsequent steps is performed. If it is determined that the radio terminal B1 is still located outside the area, the flow returns to step 203 to start the 10-second timer, and the processing in steps 203 to 206 is repeated until the radio terminal B1 is located inside the service area.

For example, a μPD70208 (a CMOS microprocessor using a 16-bit architecture and having an external 8-bit data bus) available from NEC CORP. can be used as the controller 4.

As has been described above, according to the present invention, the system identification codes of a plurality of radio systems, from which a user gets services, and selection priorities corresponding to the system identification codes are stored. When a plurality of stored identification codes are received, a radio system transmitting a system identification code, of the received codes, which corresponds to the highest selection priority is selected. Therefore, system selection can be efficiently performed in accordance with a user's request.

What is claimed is:

1. A radio telephone system, comprising:

a radio terminal, and a plurality of radio systems, each of which transmits a respective system identification code, particular radio systems of said plurality of radio systems providing service for said radio terminal, each said respective system identification code of said particular radio systems being stored in said radio terminal and defining a set of registered system identification codes, each of said registered system identification codes having stored in said radio terminal a corresponding user selectable selection priority and a corresponding user selectable selection information, said selection information indicating radio system enablement or non-enablement;

wherein when said radio terminal receives different ones of said registered system identification codes, said radio terminal selects a selected radio system of said particular radio systems which has said respective system identification code corresponding to one of said registered system identification codes which has a highest said selection priority, and which has said selection information indicating enablement.

2. The radio telephone system as set forth in claim 1, wherein said radio terminal further comprises:

first frequency setting means for setting a radio transmission/reception section to a private control radio frequency;

first memory means for storing a first one of said registered system identification codes transmitted by one of said plurality of radio systems over said private control radio frequency;

second frequency setting means for setting said radio transmission/reception section to a public control radio frequency;

second memory means for storing a second one of said registered system identification codes transmitted by another one of said plurality of radio systems over said public control radio frequency; and radio frequency selecting means for selecting a radio frequency corresponding to said selected radio system.

3. The radio system as set forth in claim 2, wherein said radio terminal further comprises display means for displaying said selected radio system.

* * * * *